US012611810B2

(12) United States Patent
Oishi et al.

(10) Patent No.: US 12,611,810 B2
(45) Date of Patent: Apr. 28, 2026

(54) SCREW MACHINE

(71) Applicant: Shibaura Machine Co., Ltd., Tokyo (JP)

(72) Inventors: Masanobu Oishi, Numazu (JP);
Toshiaki Katahira, Numazu (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 253 days.

(21) Appl. No.: 18/247,817

(22) PCT Filed: Dec. 1, 2021

(86) PCT No.: PCT/JP2021/044150
§ 371 (c)(1),
(2) Date: Apr. 4, 2023

(87) PCT Pub. No.: WO2022/138035
PCT Pub. Date: Jun. 30, 2022

(65) Prior Publication Data
US 2023/0373148 A1    Nov. 23, 2023

(30) Foreign Application Priority Data
Dec. 21, 2020    (JP) ................................. 2020-211738

(51) Int. Cl.
B29C 48/25        (2019.01)
B29C 48/40        (2019.01)
(52) U.S. Cl.
CPC .......... B29C 48/252 (2019.02); B29C 48/402 (2019.02)

(58) Field of Classification Search
CPC .............................. B29C 48/252; B29C 48/40
USPC ....................................................... 425/192 R
See application file for complete search history.

(56) References Cited

U.S. PATENT DOCUMENTS

2013/0251582 A1*   9/2013   Hamada .................. B29B 7/489
                                                            418/191

FOREIGN PATENT DOCUMENTS

| EP | 2 179 834 A2 | | 4/2010 |
|---|---|---|---|
| JP | H11105090 A | * | 4/1990 |
| JP | 2000301590 A | * | 10/2000 |
| JP | 2004-009705 A | | 1/2004 |
| JP | 2008-168459 A | | 7/2008 |

* cited by examiner

*Primary Examiner* — Susan D Leong
*Assistant Examiner* — Xinwen Ye
(74) *Attorney, Agent, or Firm* — Foley & Lardner LLP

(57)        ABSTRACT

An extruder has a pair of linkage parts configured to respectively link end portions of a pair of output shafts of the speed reducer with end portions of a pair of screws coaxially. The linkage parts each has: a coupling having an insertion hole into which the end portion of the screw and the end portion of the output shaft are inserted; and a locking part attached to the end portion of the output shaft. The coupling has a first receiving portion configured to receive the end portion of the output shaft; the second receiving portion configured to receive the locking part; and a step portion formed between the first receiving portion and the second receiving portion. As the step portion is locked by the locking part, a relative movement of the coupling relative to the output shaft in a direction towards the screw is restricted.

7 Claims, 6 Drawing Sheets

SCREW MACHINE

TECHNICAL FIELD

The present invention relates to a screw machine.

BACKGROUND ART

JP2008-168459A discloses a screw-type twin screw extruder including two screws. In this twin screw extruder, the two screws are respectively linked to output shafts of a speed reducing machine via shaft couplings, and the speed reducing machine is linked to an electric motor.

SUMMARY OF INVENTION

A linkage part (a coupling) that links the screw and the output shaft of the speed reducing machine is required to link the screw and the output shaft such that there is no relative movement in the shaft direction. A structure of such a linkage part includes a structure in which, for example, a coupling that is provided over the screw and the output shaft is screw-fastened to the screw and the output shaft with a nut.

On the other hand, for the screw machine, there is a demand for increasing a driving torque of the screw. In order to increase the driving torque of the screw, the diameter of the output shaft of a speed reducer that transmits the torque from a driving unit to the screw needs to be increased. As the diameter of the output shaft is increased, the diameter of the nut of the linkage part is also increased correspondingly.

In the screw machine (an extruder) including a pair of screws as disclosed in JP2008-168459A, a distance between the shafts of the pair of screws is defined in accordance with a shape of the screw, etc., and a space between the screws is limited.

Thus, if the linkage parts that respectively link the two screws and the output shafts of the speed reducing machine have the structure in which the couplings and the output shafts are fastened by using the nuts, there is a risk in that the nuts that respectively link the screws and the output shafts of the speed reducing machine interfere with each other. Therefore, with the structure of the linkage part in which the coupling is linked to the output shaft with the nut, the increase in the diameter of the output shaft of the speed reducing machine is limited.

An object of the present invention is to provide a screw machine in which a size of a linkage part that links a screw and an output shaft of a speed reducer is reduced.

According to one aspect of the present invention, provided is a screw machine provided with: a pair of screws arranged so as to extend in parallel, the screws being configured to mesh with each other; a driving unit configured to rotationally drive the pair of screws about respective axes; a speed reducer configured to reduce speed of rotation of the driving unit, the speed reducer being configured to output the rotation of the driving unit via a pair of output shafts; and a pair of linkage parts configured to respectively link end portions of the pair of output shafts of the speed reducer with end portions of the pair of screws coaxially, wherein the end portions of the output shafts each has an outer diameter larger than an outer diameter of the end portion of the screw to be linked, the linkage parts each has: a coupling having an insertion hole into which the end portion of the screw and the end portion of the output shaft are inserted; a fixing part configured to fix the coupling and the end portion of the screw; and a locking part attached to the end portion of the output shaft, the locking part being formed of a plurality of divided pieces divided in the circumferential direction, the locking part having an outer diameter larger than the outer diameter of the end portion of the output shaft, the coupling has: a first receiving portion configured to receive the end portion of the output shaft; a second receiving portion having an inner diameter larger than an inner diameter of the first receiving portion, the second receiving portion being configured to receive the locking part; and a step portion formed between the first receiving portion and the second receiving portion, and wherein, as the step portion of the insertion hole is locked by the locking part, a relative movement of the coupling relative to the output shaft along the axis direction of the screw in the direction towards the screw is restricted.

DESCRIPTION OF EMBODIMENTS

Figure 1:
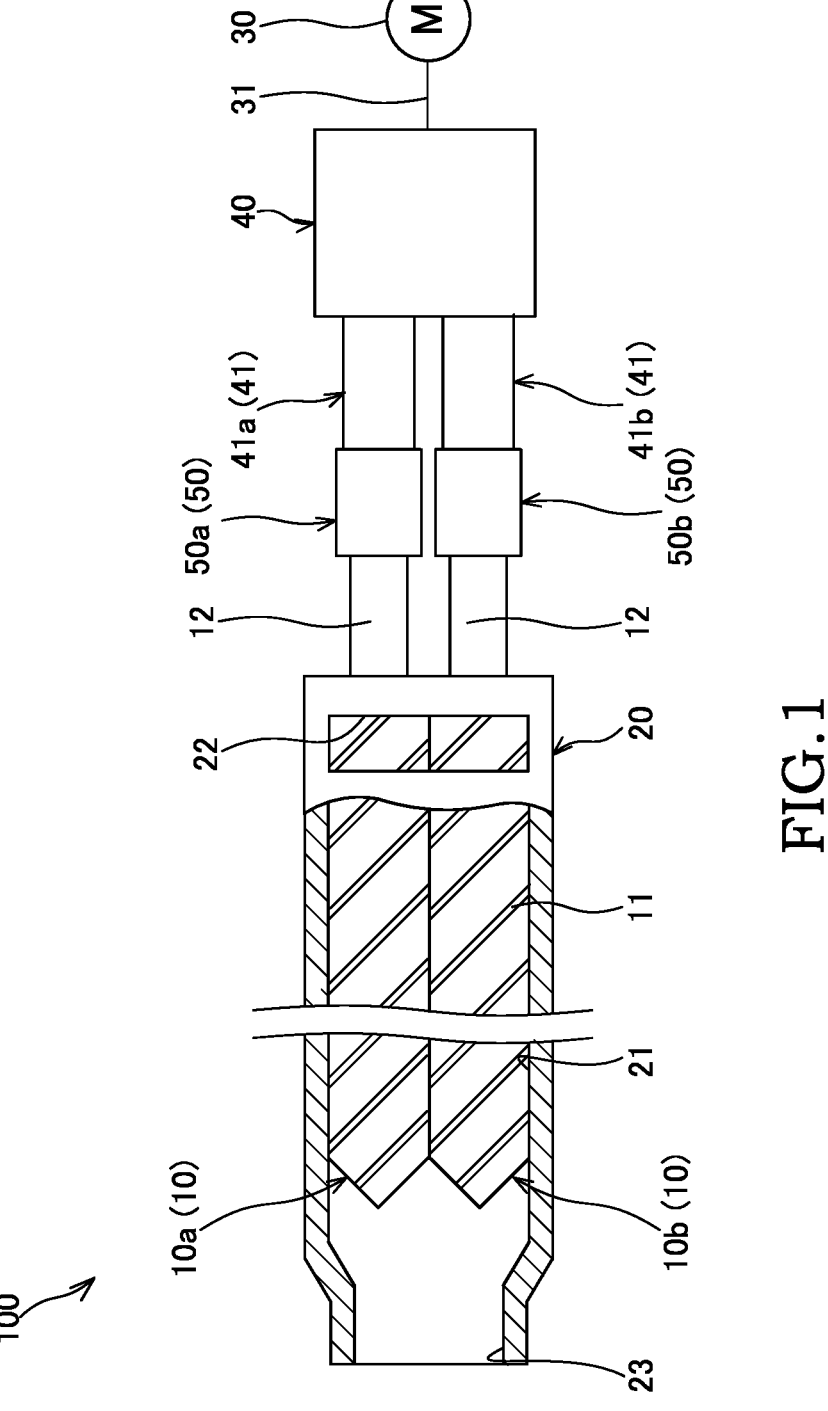
FIG. 1 is a plan view showing an overall configuration of an extruder according to an embodiment of the present invention.

In the following, a screw machine according to an embodiment of the present invention will be described with reference to the drawings. In each of the drawings, for the sake of convenience of description, the scales of the respective configurations are changed appropriately, and they are not necessarily illustrated strictly. In addition, only a part of a plurality of identical components are assigned the reference numerals, and the reference numerals may be omitted for other components.

A screw machine in this embodiment is an extruder in which a granular or powdery material fed into a screw hole 21 of a barrel 20 is kneaded while being carried by screws 10a and 10b, and the kneaded material is extruded from an outlet 23 of the barrel 20. In the following, the screw machine in this embodiment will be described in terms of "an extruder 100".

As shown in FIG. 1, the extruder 100 is provided with the pair of screws 10a and 10b, the barrel 20 that has the screw hole 21 into which the pair of screws 10a and 10b are inserted, an electric motor 30 serving as a driving unit that rotates the pair of screws 10a and 10b in the screw hole 21, and a speed reducer 40 that reduces the speed of the rotation of the electric motor 30 and transmits the rotation to the pair of screws 10a and 10b. As described above, the extruder 100 is a so called twin screw extruder provided with the pair of screws 10a and 10b.

The barrel 20 is a tubular member that is formed so as to extend in one direction and in which the screw hole 21 is formed along its longitudinal direction.

On a first end of the barrel 20 in the longitudinal direction, a feed port 22 for feeding the material into the screw hole 21 is formed so as to open to the screw hole 21. On a second end of the barrel 20 in the longitudinal direction, the outlet 23 for discharging the kneaded material made of the molten and kneaded material is formed so as to open to the screw hole 21. In the following, in the screw hole 21, the side on the feed port 22 (the right side in FIG. 1) is also referred to as "the upstream side" of the screw hole 21, and the side on the outlet 23 (the left side in FIG. 1) is also referred to as "the downstream side" of the screw hole 21. The material that has been fed into the screw hole 21 through the feed port 22 is carried to the downstream by the screws 10a and 10b and is discharged outside the barrel 20 through the outlet 23.

In addition, although illustration is omitted, the barrel 20 is provided with a heater that heats the barrel 20, a cooler that cools the barrel 20, a vacuum device that removes air, a temperature sensor that detects temperature of the barrel 20, and so forth.

The pair of screws 10a and 10b have the similar shapes with each other and are provided such that the respective center axes extend in parallel with each other at a predetermined interval. The pair of screws 10a and 10b are inserted into the screw hole 21 of the barrel 20 such that they are meshed with each other. The pair of screws 10a and 10b are rotated in the same direction about the respective center axes (the axes) by the first motor 30 (see FIG. 1). In other words, the pair of screws 10a and 10b are rotated synchronously with each other. In the following, the pair of screws 10a and 10b are collectively simply referred to as a "screw 10", and the specific configurations thereof will be described.

The screw 10 is a shaft member that is provided so as to extend along the longitudinal direction of the barrel 20 towards a tip end from a base end that is linked to the electric motor 30 via the speed reducer 40. The base end of the screw 10 is located at the upstream side of the screw hole 21, and the tip end is located at the downstream side of the screw hole 21.

The screw 10 has a spiral flight 11 (a screw blade) on its outer circumference. The material fed to the screw hole 21 from the feed port 22 is conveyed to the downstream side by the rotating screw 10. The material conveyed to the downstream side is melted and kneaded by a kneading portion (not shown) formed with a plurality of kneading discs, etc. provided on the screw 10. The material melted by the kneading portion is then extruded from the outlet 23 and discharged outside the barrel 20.

The operation of the electric motor 30 is controlled by a controller (not shown). A motor shaft 31 of the electric motor 30 is linked to the speed reducer 40, and the rotation of the motor shaft 31 is transmitted to the pair of screws 10a and 10b via the speed reducer 40. With such a configuration, the pair of screws 10a and 10b are rotationally driven by the electric motor 30.

The speed reducer 40 is provided with a pair of output shafts 41a and 41b. The speed reducer 40 reduces the speed of the rotation of the motor shaft 31 of the electric motor 30 by a gear mechanism (not shown) formed of a plurality of gears and outputs the rotation through the pair of output shafts 41a and 41b. The pair of output shafts 41a and 41b are rotated synchronously in the same direction with each other. Because a known configuration can be employed as the configuration of the gear mechanism of the speed reducer 40, a detailed description and illustration thereof will be omitted.

The pair of output shafts 41a and 41b of the speed reducer 40 are respectively linked to the pair of screws 10a and 10b coaxially with a pair of linkage parts 50a and 50b.

In the following, linkage structures between the pair of screws 10a and 10b and the pair of output shafts 41a and 41b will be described specifically. The linkage structure between the first screw 10a and the first output shaft 41a and the linkage structure between the second screw 10b and the second output shaft 41b have the same configuration with each other. Thus, in the following, the pair of screws 10a and 10b are collectively referred to as "the screw 10", the pair of output shafts 41a and 41b are collectively referred to as "the output shaft 41", and the pair of linkage parts 50a and 50b are collectively referred to as "the linkage part 50", and the linkage structure between the screw 10 and the output shaft 41 will be described.

Figure 2:
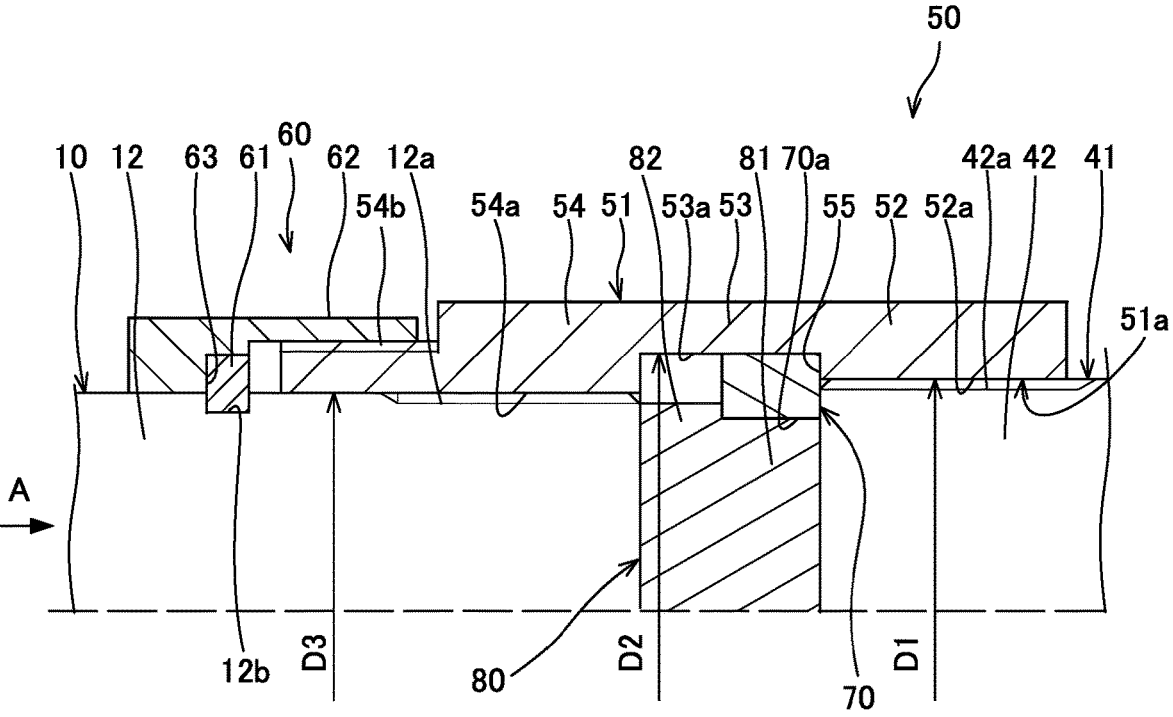
FIG. 2 is a sectional view showing a structure in a vicinity of a linkage part of the extruder according to the embodiment of the present invention.

As shown in FIG. 2, the screw 10 and the output shaft 41 are linked coaxially by the linkage part 50. A spline 42a is formed on an outer circumference of an end portion 42 of the output shaft 41 that is linked to the linkage part 50. A spline 12a is formed on an outer circumference of an end portion 12 of the screw 10 that is linked to the linkage part 50. In this embodiment, the end portion 42 of the output shaft 41 is formed to have the outer diameter that is larger than the outer diameter of the end portion 12 of the screw 10.

The linkage part 50 has: a tubular coupling 51 having an insertion hole 51a into which the end portion 12 of the screw 10 and the end portion 42 of the output shaft 41 are inserted; a fixing part 60 that fixes the coupling 51 and the end portion 12 of the screw 10; a locking part 70 that is attached to the end portion 42 of the output shaft 41; and a stopper 80 that is attached to the end portion 42 of the output shaft 41 such that the end portion 12 of the screw 10 can come into contact therewith in the shaft direction.

The insertion hole 51a of the coupling 51 is a through hole that opens at both end portions of the coupling 51 in the shaft direction and is formed so as to be coaxial with the screw 10 and the output shaft 41. The coupling 51 has: a first receiving portion 52 that receives the end portion 42 of the output shaft 41; a second receiving portion 53 that has the inner diameter that is larger than that of the first receiving portion 52 and that receives the locking part 70; and a third receiving portion 54 that receives the end portion 12 of the screw 10. The first receiving portion 52, the second receiving portion 53, and the third receiving portion 54 are provided side by side in the shaft direction of the coupling 51, in this order, from the speed reducer 40 side towards the screw 10 side (from the right side to the left side in FIG. 2). The insertion hole 51a is formed by an inner circumferential surface 52a of the first receiving portion 52, an inner circumferential surface 53a of the second receiving portion 53, and an inner circumferential surface 54a of the third receiving portion 54. In addition, a step portion 55 is formed between the first receiving portion 52 and the second receiving portion 53 by an inner diameter difference therebetween. The step portion 55 is an annular flat surface.

The inner circumferential surface 52a of the first receiving portion 52 is spline connected to the spline 42a of the end portion 42 of the output shaft 41. Thus, the rotation of the output shaft 41 is transmitted to the coupling 51 through this spline connection, and the coupling 51 is rotated along with the rotation of the output shaft 41.

A part of the inner circumferential surface 54a of the third receiving portion 54 is spline connected with the spline 12a of the end portion 12 of the screw 10. Thus, the rotation of the coupling 51, and thus, the rotation of the output shaft 41 is transmitted to the screw 10 through the spline connection, and the screw 10 is rotated along with the rotation of the output shaft 41.

An inner diameter D2 of the second receiving portion 53 is formed so as to be larger than an inner diameter D1 of the first receiving portion 52, and thus, so as to be larger than an inner diameter D3 of the third receiving portion 54 (D2>D1>D3). The outer diameter of the end portion 42 of the output shaft 41 substantially matches with the inner diameter D1 of the first receiving portion 52. The outer diameter of the locking part 70 substantially matches with the inner diameter D2 of the second receiving portion 53. The outer diameter of the end portion 12 of the screw 10 substantially matches with the inner diameter D3 of the third receiving portion 54. Thus, in the following, they are also referred to as "an outer diameter D1 of the end portion 42 of the output shaft 41", "an outer diameter D2 of the locking part 70", and "an outer diameter D3 of the end portion 12 of the screw 10", respectively.

Figure 3:
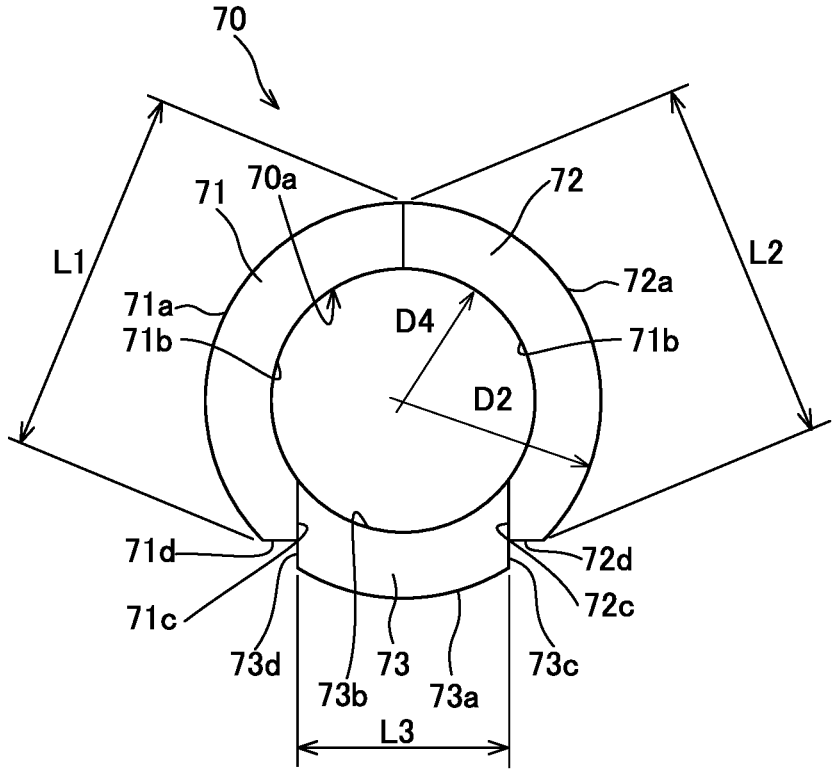
FIG. 3 is a front view of a locking part of the extruder according to the embodiment of the present invention.

As shown in FIG. 3, the locking part 70 is formed to have an annular shape having a center hole 70a with a plurality of divided pieces that are divided in the circumferential direction. The locking part 70 has the outer diameter D2 that is larger than the outer diameter D1 of the end portion 42 of the output shaft 41, and a part thereof on the radially outside opposes to the step portion 55 of the coupling 51.

As shown in FIG. 2, the locking part 70 is attached to the tip end of the output shaft 41 by the stopper 80. The stopper 80 has a columnar-shaped boss portion 81 that is inserted through the center hole 70a of the locking part 70 and a flange portion 82 that is provided on an end portion of the boss portion 81 and that has the outer diameter larger than that of the boss portion 81. An end portion of the boss portion 81 on the opposite side from the flange portion 82 comes to contact with an end surface of the output shaft 41. The outer diameter of the flange portion 82 is smaller than the inner diameter of the insertion hole 51a in the third receiving portion 54. In other words, the outer diameter of the flange portion 82 is smaller than the outer diameter D2 of the locking part 70.

The stopper 80 is attached to the end portion 42 of the output shaft 41 by a bolt (not shown). With such a configuration, the locking part 70 is attached to the output shaft 41 by being clamped between the end surface of the output shaft 41 and the flange portion 82 of the stopper 80. In this configuration, the locking part 70 and the flange portion 82 may be in contact with each other all the time, or a gap may be formed between the locking part 70 and the flange portion 82. An end surface of the flange portion 82 is formed to have a circular flat surface and opposes to an end surface of the screw 10.

As shown in FIG. 3, the locking part 70 is formed of the plurality of divided pieces that are formed by dividing an annular ring member having a predetermined plate thickness along the circumferential direction. In this embodiment, the locking part 70 is formed of three divided pieces including a first divided piece 71, a second divided piece 72, and a third divided piece 73.

The first divided piece 71, the second divided piece 72, and the third divided piece 73 are each formed to have a substantially fan shape having an outer circumference arc portion 71a, 72a, or 73a forming a part of a circular outer circumferential surface of the locking part 70 and an inner circumference arc portion 71b, 72b, or 73b forming a part of an inner circumferential surface of the center hole 70a of the locking part 70. Dimensions L1, L2, and L3 of chords for the respective outer circumference arc portions 71a, 72a, and 73a of the first divided piece 71, the second divided piece 72, and the third divided piece 73 are formed to be equal to or smaller than the inner diameter D3 of the third receiving portion 54 (L1<D3, L2<D3, and L3<D3). In other words, the largest dimensions L1, L2, and L3 for external shapes of the first divided piece 71, the second divided piece 72, and the third divided piece 73 are formed to be equal or smaller than the inner diameter D3 of the third receiving portion 54. With such a configuration, the first divided piece 71, the second divided piece 72, and the third divided piece 73 can be received in the insertion hole 51a from the screw 10 side at the orientation at which the center axis of the center hole 70a of the locking part 70 extends in parallel with the center axis of the insertion hole 51a of the coupling 51.

The first divided piece 71 and the second divided piece 72 are formed to have the same shape with each other. In the third divided piece 73, the dimension L3 of the chord for the outer circumference arc portion 73a is smaller than the dimensions L1 and L2 of the chords of the first divided piece 71 and the second divided piece 72 (L1=L2>L3). The third divided piece 73 has a pair of parallel portions 73c and 73d that are provided so as to be in parallel with each other while forming a gap, which is smaller than the inner diameter of the center hole 70a of the locking part 70, therebetween. In other words, the dimension L3 of the chord for the outer circumference arc portion 73a of the third divided piece 73 is smaller than an inner diameter D4 of the center hole 70a of the locking part 70 (D4>L3). The pair of parallel portions 73c and 73d are flat surfaces respectively facing the first divided piece 71 and the second divided piece 72, thereby connecting the outer circumference arc portion 73a of the third divided piece 73 and the inner circumference arc portion 73b.

In addition, the first divided piece 71 and the second divided piece 72 are respectively provided with flat surface portions 71c and 72c that are in surface contact with the parallel portions 73c and 73d of the third divided piece 73 and chamfered portions 71d and 72d that are respectively formed to extend perpendicularly with respect to the flat surface portions 71c and 72c so as to respectively intersect with the flat surface portions 71c and 72c. By providing the chamfered portions 71d and 72d, an end portion of one of the first divided piece 71 and the second divided piece 72 is prevented from becoming a sharp shape (a so-called pin angle), and so, it is possible to prevent occurrence of a stress concentration. In addition, because the chamfered portions 71d and 72d are provided, the dimensions L1 and L2 of the chords for the outer circumference arc portions 71a and 72a become shorter, and so, the first divided piece 71 and the second divided piece 72 can be inserted into the insertion hole 51a with ease.

As shown in FIG. 2, the fixing part 60 has a split color 61 that is installed into an annular recessed portion 12b formed in an outer circumference of the end portion 12 of the screw 10 and a nut 62 that joins the end portion 12 of the screw 10 and the coupling 51 via the split color 61.

The split color 61 is a ring member that has a shape separated in the circumferential direction and that is capable of being expanded/compacted in the radial direction. The split color 61 is formed to have the outer diameter that is larger than the outer diameter D3 of the end portion 12 of the screw 10, in a state in which it is mounted on the outer circumference of the end portion 12 of the screw 10. The split color 61 is locked with respect to the recessed portion 12*b* of the screw 10 in the shaft direction.

An external thread portion 54*b* with which the nut 62 is threaded is formed on the outer circumference of the third receiving portion 54 of the coupling 51. An inner circumference of the nut 62 is formed with a seating portion 63 that comes to contact with the split color 61 in the shaft direction. The nut 62 is threaded to the external thread portion 54*b* of the coupling 51 in a state in which the seating portion 63 of the nut 62 is in contact with the split color 61, and the nut 62 is tightened at a predetermined tightening force, and thereby, the screw 10 and the coupling 51 are screw-fastened via the nut 62 and the split color 61. With such a configuration, the screw 10 is fixed to the coupling 51 by the fixing part 60.

Next, a method of linking the screw 10 and the output shaft 41 in this embodiment will be described with main reference to FIGS. 4A to 4E. In FIGS. 4A to 4E, the up and down directions in the figures show the up and down directions in the vertical direction. In addition, a broken line in FIGS. 4A to 4E schematically shows the inner circumferential surface 54*a* of the third receiving portion 54.

In order to link the screw 10 and the output shaft 41, the end portion 42 of the output shaft 41 is first inserted into the first receiving portion 52 of the coupling 51 to spline connect the output shaft 41 and the coupling 51.

Figure 4A:
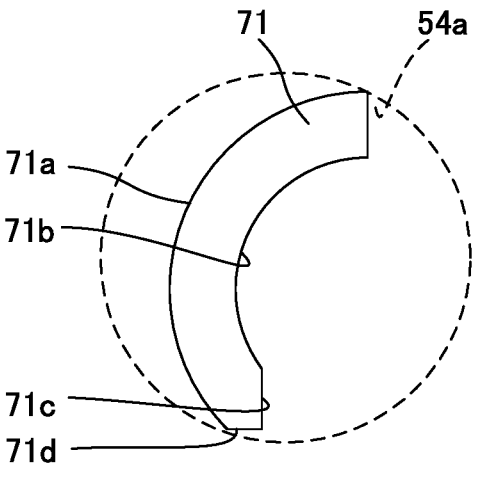
FIG. 4A is a diagram for explaining an assembling method of a linkage structure of the extruder according to the embodiment of the present invention, and is a front view of the locking part viewed from an arrow A in FIG. 2.
Figure 4B:
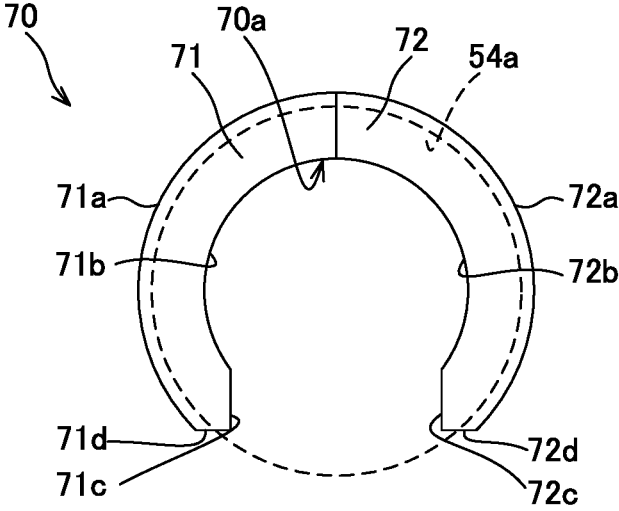
FIG. 4B is a diagram for explaining the assembling method of the linkage structure of the extruder according to the embodiment of the present invention, and is a front view of the locking part viewed from the arrow A in FIG. 2.

Next, the locking part 70 is received in the second receiving portion 53 of the coupling 51. Specifically, as shown in FIGS. 4A and 4B, in a state in which an opening into which the third divided piece 73 is to be arranged is oriented relatively downward, the first divided piece 71 and the second divided piece 72 are inserted into the insertion hole 51*a* from the other side (from the screw 10 side). At this time, the largest dimensions L1 and L2 of the first divided piece 71 and the second divided piece 72 are smaller than the inner diameter D3 of the third receiving portion 54, and therefore, as shown in FIG. 4A, the first divided piece 71 and the second divided piece 72 can be inserted with ease into the insertion hole 51*a* from the screw 10 side while keeping the orientation at which they are received in the second receiving portion 53 (the orientation shown in FIG. 2).

Figure 4C:
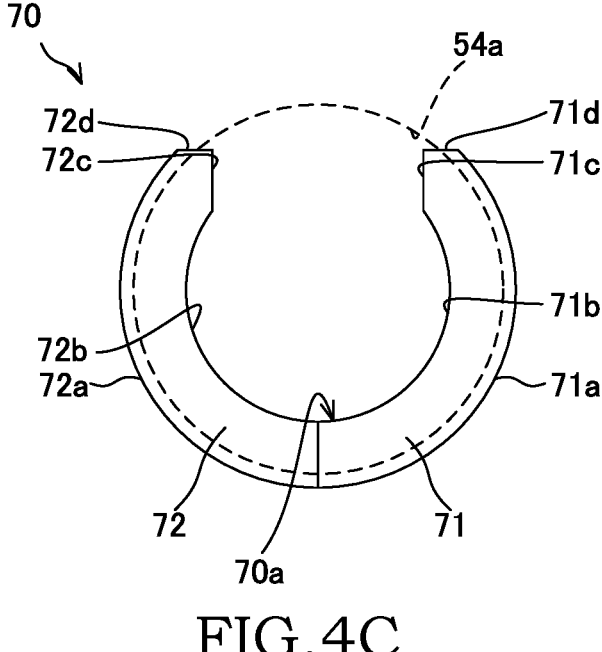
FIG. 4C is a diagram for explaining the assembling method of the linkage structure of the extruder according to the embodiment of the present invention, and is a front view of the locking part viewed from the arrow A in FIG. 2.

Next, as shown in FIG. 4C, the first divided piece 71 and the second divided piece 72 are rotated in the insertion hole 51*a* by 180° about the center axis of the insertion hole 51*a* such that the opening, into which the third divided piece 73 is to be arranged, is positioned upward in a relative manner. In this state, the first divided piece 71 and the second divided piece 72 are arranged such that the flat surface portions 71*c* and 72*c* extend along the vertical direction. The third divided piece 73 is then inserted into the insertion hole 51*a* and arranged between the first divided piece 71 and the second divided piece 72, thereby forming the locking part 70 having the annular shape.

Figure 4D:
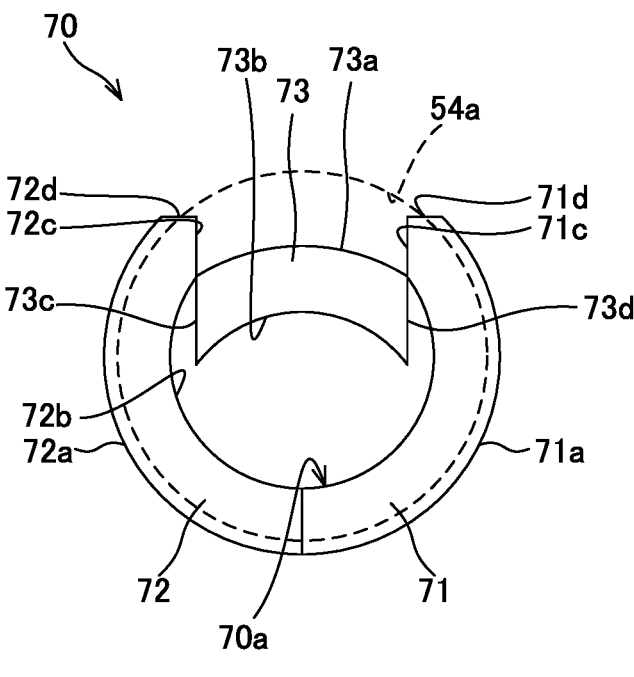
FIG. 4D is a diagram for explaining the assembling method of the linkage structure of the extruder according to the embodiment of the present invention, and is a front view of the locking part viewed from the arrow A in FIG. 2.

In the above, the third divided piece 73 is provided with the pair of parallel portions 73*c* and 73*d*, and the first divided piece 71 and the second divided piece 72 are respectively provided with the flat surface portions 71*c* and 72*c*. Therefore, as shown in FIG. 4D, by inserting the third divided piece 73 between the first divided piece 71 and the second divided piece 72 through the vicinity of the center of the insertion hole 51*a* in the radial direction, and by moving the third divided piece 73 radially outward (upward in FIG. 4D)

subsequently, it is possible to arrange the third divided piece 73 between the first divided piece 71 and the second divided piece 72. As described above, by inserting the third divided piece 73 once in the insertion hole 51*a* through the vicinity of the center of the insertion hole 51*a* and by moving the third divided piece 73 in the radial direction subsequently, it is possible to arrange the third divided piece 73 at a predetermined position and to form the locking part 70 having the outer diameter that is larger than the inner diameters of the first receiving portion 52 and the third receiving portion 54 with ease.

Figure 4E:
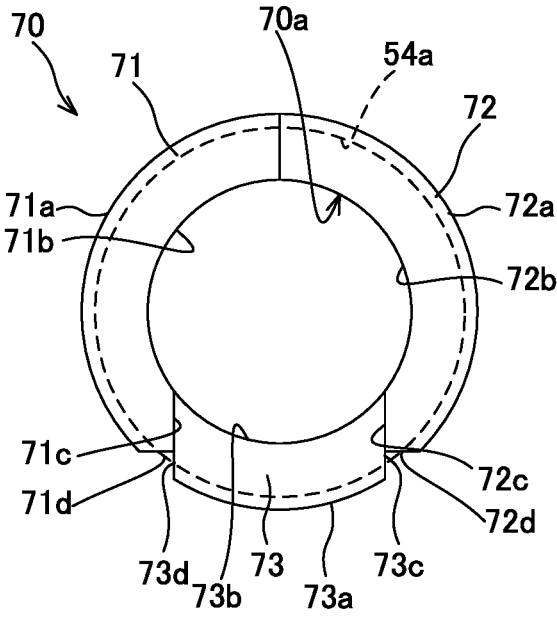
FIG. 4E is a diagram for explaining the assembling method of the linkage structure of the extruder according to the embodiment of the present invention, and is a front view of the locking part viewed from the arrow A in FIG. 2.

Next, as shown in FIG. 4E, the first divided piece 71, the second divided piece 72, and the third divided piece 73 are rotated by 180° about the center axis of the insertion hole 51*a* such that the third divided piece 73 is arranged downward in a relative manner. By doing so, the first divided piece 71, the second divided piece 72, and the third divided piece 73 are kept in places without any supports, and thus, it is possible to keep the shape of the annular locking part 70.

Next, the stopper 80 is inserted into the insertion hole 51*a*, and the boss portion 81 of the stopper 80 is inserted into the center hole 70*a* of the locking part 70 (see FIG. 2). In this state, the stopper 80 is attached to the output shaft 41 with the bolt. By doing so, the locking part 70 is attached to the output shaft 41 by the stopper 80.

Next, the nut 62 is inserted to the outer circumference of the end portion 12 of the screw 10, and thereafter, the split color 61 is attached to the outer circumference of the end portion 12 of the screw 10. The end portion 12 of the screw 10, on the outer circumference of which the nut 62 and the split color 61 are attached, is inserted into the insertion hole 51*a* of the coupling 51 until the end portion 12 comes to contact with the stopper 80, and then, the screw 10 is spline connected with the coupling 51.

Next, the nut 62 is screw-fastened to the coupling 51 at a predetermined fastening force, and thereby, the screw 10 and the coupling 51 are fixed with each other.

As described above, the screw 10 is linked with the output shaft 41 by the linkage part 50. With such a configuration, the movement of the screw 10 in the shaft direction towards the output shaft 41 is restricted as the screw 10 comes to contact with the stopper 80. In addition, the movement of the screw 10 in the direction away from the output shaft 41 is restricted as the step portion 55 of the coupling 51 linked to the screw 10 is locked by the outer circumference of the locking part 70 attached to the output shaft 41. As described above, the screw 10 and the output shaft 41 are linked by the linkage part 50 so as not to be relatively movable in the shaft direction. With such a configuration, it is possible to prevent occurrence of displacement of meshing between the screws 10*a* and 10*b* and interference between the screws 10*a* and 10*b* due to the relative movement of the pair of screws 10*a* and 10*b* in the shaft direction.

In addition, because the screw 10 and the output shaft 41 are locked in the shaft direction by the step portion 55 inside the coupling 51 and the locking part 70 received in the coupling 51, it is possible to suppress the size increase in the linkage part 50 in the radial direction. Thus, the diameter of the output shaft 41 can be increased with ease in order to increase the driving torque of the screw 10.

In addition, in this embodiment, the outer diameter D1 of the end portion 42 of the output shaft 41 of the speed reducer 40 is larger than the outer diameter D3 of the end portion 12 of the screw 10. Thus, in order to lock the step portion 55 on the inner circumference of the coupling 51 and the locking part 70, the outer diameter D2 of the locking part 70 is formed so as to be larger than the outer diameter D1 of the end portion 42 of the output shaft 41, and thus, so as to be larger than the outer diameter D3 of the end portion 12 of the screw 10 (D2>D1>D3). In contrast, because the locking part 70 has the shape formed by the plurality of divided pieces formed by being divided along the circumferential direction, even when the outer diameter of the locking part 70 is larger than the outer diameter D3 of the end portion 12 of the screw 10 (the inner diameter D3 of the third receiving portion 54), the insertion thereof into the insertion hole 51*a* can be performed with ease, and so, it is possible to achieve the assembly with ease.

Next, a modification of this embodiment will be described. The modifications described below also falls within the scope of the present invention. It may also be possible to combine the following modifications with the respective configurations in the above-described embodiment, and it may also be possible to combine the following modifications with each other. In addition, in the respective modifications, the configurations that are similar to those in the above-mentioned embodiment are assigned the same reference signs, and descriptions thereof shall be omitted.

In the above-mentioned embodiment, the screw machine is a so-called the twin screw extruder provided with the pair of screws 10*a* and 10*b*. In contrast, it suffices that the screw machine is provided with at least a pair of screws, and the screw machine may be a multi-screw extruder provided with three or more screws.

In addition, in the above-mentioned embodiment, the screw machine is the extruder 100 that kneads and extrudes the material. In contrast, the screw machine may be a multi-screw material feeder (a side feeder) that feeds the material to the extruder 100. The screws of the material feeder are not provided with the kneading portion, and the material is conveyed without being kneaded and melted.

In addition, in the above-mentioned embodiment, the pair of screws 10*a* and 10*b* are rotated in the same direction with each other. In contrast, the pair of screws 10*a* and 10*b* may be rotated in the opposite directions from each other.

In addition, in the above-mentioned embodiment, the locking part 70 is formed of three divided pieces and formed to have the annular shape such that the entire circumference thereof in the circumferential direction is in contact with the coupling 51. In contrast, the locking part 70 may be formed of two divided pieces, or the locking part 70 may be formed of four or more divided pieces. In addition, the locking part 70 may be formed to have, for example, a shape in which gaps are formed between the divided pieces in the circumferential direction, such that only a part of the locking part 70 in the circumferential direction comes into contact with the coupling 51. In addition, in the above-mentioned embodiment, although the locking part 70 is formed of the three divided pieces, and the third divided piece 73 has a different shape from the first divided piece 71 and the second divided piece 72, the locking part 70 may be formed of the divided pieces that are respectively formed to have the same shape with each other.

In the following, operational advantages of this embodiment will be described.

The extruder 100 is provided with: the pair of screws 10 arranged so as to extend in parallel, the screws 10 being configured to mesh with each other; the electric motor 30 configured to rotationally drive the pair of screws 10 about the respective axes; the speed reducer 40 configured to reduce the speed of the rotation of the electric motor 30, the speed reducer 40 being configured to output the rotation of the electric motor 30 via the pair of output shafts 41; and the pair of linkage parts 50 configured to respectively link the end portions 42 of the pair of output shafts 41 of the speed reducer 40 with the end portions 12 of the pair of screws 10 coaxially, wherein the end portions 42 of the output shafts 41 each has the outer diameter larger than the outer diameter of the end portion 12 of the screw 10 to be linked, the linkage parts 50 each has: the coupling 51 having the insertion hole 51*a* into which the end portion 12 of the screw 10 and the end portion 42 of the output shaft 41 are inserted; the fixing part 60 configured to fix the coupling 51 and the end portion 12 of the screw 10; and the locking part 70 attached to the end portion 42 of the output shaft 41, the locking part 70 being formed of the plurality of divided pieces divided in the circumferential direction, the locking part 70 having the outer diameter larger than the outer diameter of the end portion 42 of the output shaft 41, the coupling 51 has: the first receiving portion 52 configured to receive the end portion 42 of the output shaft 41; the second receiving portion 53 having the inner diameter larger than the inner diameter of the first receiving portion 52, the second receiving portion 53 being configured to receive the locking part 70; and the step portion 55 formed between the first receiving portion 52 and the second receiving portion 53, and wherein, as the step portion 55 of the insertion hole 51*a* is locked by the locking part 70, the relative movement of the coupling 51 relative to the output shaft 41 along the axis direction of the screw 10 in the direction towards the screw 10 is restricted.

In addition, in the extruder 100, each of the linkage parts 50 further has the stopper 80, the stopper 80 being attached to the end portion 42 of the output shaft 41 so as to oppose to the end portion 12 of the screw 10, and the locking part 70 is attached to the output shaft 41 by being clamped between the stopper 80 and the end portion 42 of the output shaft 41.

With the extruder 100 having such a configuration, the locking part 70 is formed of the plurality of divided pieces that can be divided so as to have the outer diameter larger than the outer diameter of the output shaft 41. By inserting the locking part 70 into the insertion hole 51*a* of the coupling 51 so as to be locked by the step portion 55 of the insertion hole 51*a*, the relative movement between the output shaft 41 and the coupling 51 in the direction towards the screw 10 is restricted. As described above, because the structure that restricts the relative movement between the output shaft 41 and the coupling 51, and thus, the relative movement between the output shaft 41 and the screw 10 is formed inside the coupling 51, it is possible to achieve the size reduction of the configuration of the linkage part 50.

In addition, in the extruder 100, the locking part 70 is formed to have an annular shape, the locking part 70 being locked by the step portion 55 of the coupling 51 entirely over the circumferential direction of the output shaft 41.

In this configuration, it is possible to sufficiently ensure a contact area between the locking part 70 and the step portion 55 of the insertion hole 51*a*, and so, it is possible to lock the locking part 70 with the step portion 55 more reliably.

In addition, in the extruder 100, the locking part 70 is formed of three pieces of the divided pieces so as to have the annular shape having the center hole 70*a*, the three divided pieces being the first divided piece 71, the second divided piece 72, and the third divided piece 73.

In addition, in the extruder 100, the coupling 51 further has the third receiving portion 54 connected to the second receiving portion 53, the third receiving portion 54 being configured to receive the end portion 12 of the screw 10, the first divided piece 71, the second divided piece 72, and the third divided piece 73 each has the outer circumference arc portion 71a, 72a, or 73a forming a part of a circular outer circumferential surface of the locking part 70, the outer circumference arc portion 71a, 72a, or 73a being formed such that the dimension L1, L2, or L3 of the chord for the outer circumference arc portion 71a, 72a, or 73a is equal to or shorter than the inner diameter of the third receiving portion 54, the first divided piece 71 and the second divided piece 72 have the same shape with each other, and the third divided piece 73 has: the inner circumference arc portion 73b forming the part of the inner circumferential surface of the center hole 70a of the locking part 70; and the pair of parallel portions 73c and 73d extending in parallel with the center axis of the center hole 70a, the pair of parallel portions 73c and 73d being provided in parallel with each other so as to form a gap between the pair of parallel portions 73c and 73d, the gap being smaller than the inner diameter of the center hole 70a, and the pair of parallel portions 73c and 73d connecting the outer circumference arc portion 73a with the inner circumference arc portion 73b.

In this configuration, because the third divided piece 73 has the pair of parallel portions 73c and 73d, the locking part 70 is formed by first inserting the first divided piece 71 and the second divided piece 72 into the insertion hole 51a, then inserting the third divided piece 73 into the insertion hole 51a, and subsequently, moving the third divided piece 73 radially outward along the parallel portions 73c and 73d. With such a configuration, it is possible to assemble, inside the insertion hole 51a, the locking part 70 having the outer diameter larger than the outer diameter of the output shaft 41 with ease.

Although the embodiments of the present invention have been described in the above, the above-mentioned embodiments merely illustrate a part of application examples of the present invention, and the technical scope of the present invention is not intended to be limited to the specific configurations of the above-described embodiments.

The present application claims priority to Japanese Patent Application No. 2020-211738, filed in the Japan Patent Office on Dec. 21, 2020. The contents of this application are incorporated herein by reference in their entirety.

The invention claimed is:

1. A screw machine comprising:
a pair of screws arranged so as to extend in parallel, the screws being configured to mesh with each other;
a driving unit configured to rotationally drive the pair of screws about respective axes;
a speed reducer configured to reduce speed of rotation of the driving unit, the speed reducer being configured to output the rotation of the driving unit via a pair of output shafts; and
a pair of linkage parts configured to respectively link end portions of the pair of output shafts of the speed reducer with end portions of the pair of screws coaxially, wherein
the end portions of the output shafts each has an outer diameter larger than an outer diameter of the end portions of the pair of screws to be linked,
the linkage parts each has:
a coupling having an insertion hole into which an end portion of a screw of the pair of screws and an end portion of an output shaft of the pair of output shafts are inserted;
a fixing part configured to fix the coupling and the end portion of the screw; and
a locking part attached to the end portion of the output shaft, the locking part being formed of a plurality of divided pieces divided in a circumferential direction, the locking part having an outer diameter larger than the outer diameter of the end portion of the output shaft,
the coupling has:
a first receiving portion configured to receive the end portion of the output shaft;
a second receiving portion having an inner diameter larger than an inner diameter of the first receiving portion, the second receiving portion being configured to receive the locking part; and
a step portion formed between the first receiving portion and the second receiving portion;
as the step portion of the insertion hole is locked by the locking part, a relative movement of the coupling relative to the output shaft along an axis direction of the screw in a direction towards the screw is restricted,
each of the linkage parts further has a stopper, the stopper being attached to the end portion of the output shaft so as to oppose to the end portion of the screw, and wherein
the locking part is attached to the output shaft by being clamped between the stopper and the end portion of the output shaft.

2. The screw machine according to claim 1, wherein the locking part is formed to have an annular shape, the locking part being locked by the step portion of the coupling entirely over a circumferential direction of the output shaft.

3. The screw machine according to claim 2, wherein the locking part is formed of three pieces of the divided pieces so as to have an annular shape having a center hole, the three divided pieces being a first divided piece, a second divided piece, and a third divided piece.

4. The screw machine according to claim 3, wherein the coupling further has a third receiving portion connected to the second receiving portion, the third receiving portion being configured to receive the end portion of the screw,
the first divided piece, the second divided piece, and the third divided piece of the locking part each has an outer circumference arc portion forming a part of a circular outer circumferential surface of the locking part, the outer circumference arc portion being formed such that a chord for the outer circumference arc portion is equal to or shorter than an inner diameter of the third receiving portion,
the first divided piece and the second divided piece have a same shape with each other, and
the third divided piece has:
an inner circumference arc portion forming a part of an inner circumferential surface of the center hole of the locking part; and
a pair of parallel portions extending in parallel with a center axis of the center hole, the pair of parallel portions being provided in parallel with each other so as to form a gap between the pair of parallel portions, the gap being smaller than an inner diameter of the center hole, and the pair of parallel portions connecting the outer circumference arc portion with the inner circumference arc portion.

5. The screw machine according to claim 1, wherein the driving unit is a motor.

6. The screw machine according to claim 1, wherein the fixing part has a nut that joins the end portion of the screw and the coupling.

7. A screw machine comprising:

a pair of screws arranged so as to extend in parallel, the screws being configured to mesh with each other;

a driving unit configured to rotationally drive the pair of screws about respective axes;

a speed reducer configured to reduce speed of rotation of the driving unit, the speed reducer being configured to output the rotation of the driving unit via a pair of output shafts; and a pair of linkage parts configured to respectively link end portions of the pair of output shafts of the speed reducer with end portions of the pair of screws coaxially, wherein the end portions of the output shafts each has an outer diameter larger than an outer diameter of the end portions of the pair of screws to be linked, the linkage parts each has:

a coupling having an insertion hole into which an end portion of a screw of the pair of screws and an end portions of an output shaft of the pair of output shafts are inserted;

a fixing part configured to fix the coupling and the end portion of the screw; and a locking part attached to the end portion of the output shaft, the locking part being formed of a plurality of divided pieces divided in a circumferential direction, the locking part having an outer diameter larger than the outer diameter of the end portion of the output shaft, the coupling has:

a first receiving portion configured to receive the end portion of the output shaft;

a second receiving portion having an inner diameter larger than an inner diameter of the first receiving portion, the second receiving portion being configured to receive the locking part;

a step portion formed between the first receiving portion and the second receiving portion;

as the step portion of the insertion hole is locked by the locking part, a relative movement of the coupling relative to the output shaft along an axis direction of the screw in a direction towards the screw is restricted, the locking part is formed to have an annular shape, the locking part being locked by the step portion of the coupling entirely over a circumferential direction of the output shaft, the locking part is formed of three pieces of the divided pieces so as to have an annular shape having a center hole, the three divided pieces being a first divided piece, a second divided piece, and a third divided piece, the coupling further has a third receiving portion connected to the second receiving portion, the third receiving portion being configured to receive the end portion of the screw, the first divided piece, the second divided piece, and the third divided piece of the locking part each has an outer circumference arc portion forming a part Of a circular outer circumferential surface of the locking part, the outer circumference arc portion being formed such that a chord for the outer circumference arc portion is equal to or shorter than an inner diameter of the third receiving portion, the first divided piece and the second divided piece have a same shape with each other, and the third divided piece has:

an inner circumference arc portion forming a part of an inner circumferential surface of the center hole of the locking part; and a pair of parallel portions extending in parallel with a center axis of the center hole, the pair of parallel portions being provided in parallel with each other so as to form a gap between the pair of parallel portions, the gap being smaller than an inner diameter of the center hole, and the pair of parallel portions connecting the outer circumference arc portion with the inner circumference arc portion.

* * * * *